United States Patent [19]

Jacopi

[11] Patent Number: 5,287,493
[45] Date of Patent: Feb. 15, 1994

[54] DATABASE INTERACTIVE PROMPTED QUERY SYSTEM HAVING NAMED DATABASE TABLES LINKED TOGETHER BY A USER THROUGH JOIN STATEMENTS

[75] Inventor: Thomas W. Jacopi, San Jose, Calif.

[73] Assignee: International Business Machines Corporation, Armonk, N.Y.

[21] Appl. No.: 576,022

[22] Filed: Aug. 31, 1990

[51] Int. Cl.$^5$ .................. G06F 15/40; G06F 15/419
[52] U.S. Cl. .................. 395/600; 364/282.1; 364/282.3; 364/283.1; 364/283.2; 364/283.3; 364/283.4; 364/251.5; 364/251.6; 364/254.6; 364/DIG. 1
[58] Field of Search .................. 395/600, 149; 371/7, 371/11.3

[56] References Cited

PUBLICATIONS

Robert Sedgewick, *Algorithms*, 1983, pp. 373–388.
C. J. Date, *An Introduction to Database Systems*, 1986, pp. 58–61.

*Primary Examiner*—Thomas C. Lee
*Assistant Examiner*—Paul Harrity
*Attorney, Agent, or Firm*—G. Marlin Knight

[57] ABSTRACT

Method and computer database system for implementing an interactive prompted query system in a database system having a plurality of named database tables which a user can link together for query purposes by entering join statements. The join statements are analyzed by determining that one or more groups of separately linked database table names are referenced in the join statements. If more than one group exists, then the join statements are adjusted so that only a single group of separately linked database table names is referenced by the join statements. The single group of names may be determined by selecting the group which contains the name first entered by the user, by selecting the group which contains the highest number of names, by prompting the user to select the group or by any other logical means. More particularly, the join statements are analyzed using a graphical technique to determine the groups of tables. The tables are represented as nodes and the join relationships are represented as lines. The lines are traced to determine all of the nodes connected to form a single graph. Each graph represents a separately linked group of database tables.

15 Claims, 5 Drawing Sheets

| LEFT | RIGHT | CL | CR |
|---|---|---|---|
| A | B | — | — |
| B | C | — | — |
| B | D | — | — |
| C | E | — | — |
| D | E | — | — |
| D | E | — | — |

```
501 Do I from 1 to N
502    GRAPH_INDENTIFIERS( I ) = I
503    GRAPH_ID_COUNT( I ) = 0
504 Enddo 505 Do For Entry in Join List
506    L_SYMBOL = GRAPH_IDENTIFIERS( NUMERIC_INDEX( Left_Side_Node ) )
507    R_SYMBOL = GRAPH_IDENTIFIERS( NUMERIC_INDEX( Right_Side_Node ) )
508    If L_SYMBOL ≠ R_SYMBOL Then
509       Do I From 1 to N
510          If GRAPH_IDENTIFIERS( I ) = R_SYMBOL Then
511             GRAPH_IDENTIFIERS( I ) = L_SYMBOL
512       Enddo
513 Enddo 514 MULTIPLE_GRAPHS = False
515 Do I From 1 to N
516    GRAPH_USED = GRAPH_INDENTIFIERS( I )
517    GRAPH_ID_COUNT(GRAPH_USED) = GRAPH_ID_COUNT(GRAPH_USED) + 1
518    If GRAPH_IDENTIFIERS( I ) ≠ GRAPH_IDENTIFIERS( 1 ) Then
519       MULTIPLE_GRAPHS = True
520 Enddo
```

FIG. 5

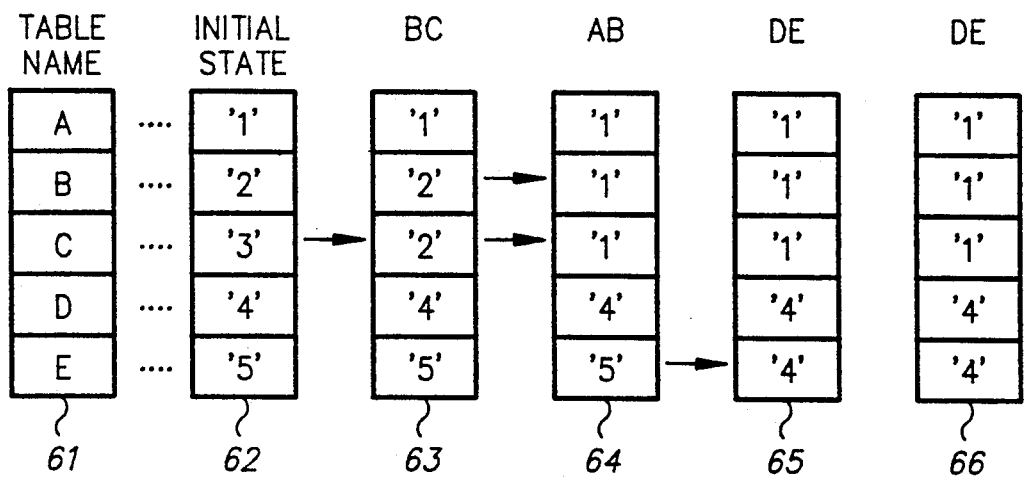

FIG. 6

DATABASE INTERACTIVE PROMPTED QUERY SYSTEM HAVING NAMED DATABASE TABLES LINKED TOGETHER BY A USER THROUGH JOIN STATEMENTS

TECHNICAL FIELD

The present invention relates to a method and a system in the field of interactive computer database information retrieval for analyzing relationships between various database tables specified in a query.

BACKGROUND OF THE INVENTION

One method of organizing a computer database is to separate the data into tables which consist of rows and columns of data. For example, in a table of employee data a row might contain information about a particular employee while a column might contain the department number of each employee. A database will typically have many tables and each table will typically have multiple rows and multiple columns.

Data may be retrieved from this type of database by a variety of methods. For example, a computer program can extract information from the database without human intervention or a user can interact with a query system program which serves as a front-end to the database system. It is conventional for these query system programs to prompt the user for information to make the task of entering the required information for the retrieval easier. These systems are known as prompted query systems (PQS).

A user interacting with a PQS will typically be prompted to specify which tables are to be searched and to specify relationships between various columns of the tables. Specifying the column relationships between tables is called joining the tables. Tables are joined by pairwise association of columns between the tables. Joins allow additional information to be obtained across tables in a meaningful way so that data in one table may explain or clarify data in another table. For example, an Employee-table row for an employee may list the employee's department number as '76', but the definition of department '76' requires reference to another table, the Department-table, which lists the full department title associated with each department number. In this second table the row for department '76' also contains a column with the department title "Information Systems Department." Thus, a user desiring to generate a report containing a list of all employees including their department titles may want to establish a join relationship between the department number column in the Employee-table and the department title column in the Department-table, so that the employee's department can be printed in the title form instead of the numerical form.

Joins are specified to the PQS by entering statements such as
W and X
X and Y
Y and Z
where W, X, Y and Z are symbolic names given to columns in specific tables. A join implies four pieces of information: two table names and two column names. When the user enters a column name, a table name is implied or referenced indirectly. The table names corresponding to columns W, X, etc., can be written as T(W), T(X), etc. to indicate that the table name can be found based on the column name. The PQS must maintain a join list which contains sufficient information to fully specify all of the current joins. The information in the join list in this context can be symbolic names such as 'Q.TAB1', memory addresses which allow the referenced information to be found, or any other means of indirect referencing. The join list can also be simply the list of join statements.

During an interactive session with a PQS a user may develop the final query through a trial and error process during which the user may make mistakes in specifying tables or joins or may delete a previously specified table or join. For these reasons among others, it is necessary that the join list be analyzed for coherence. When one or more joins are removed from a list that was previously coherent, the list may no longer be coherent. For example, if the X and Y join were deleted from the three joins listed above and T(W), T(X), T(Y), and T(Z) were all separate tables, there would be no link between the W-X pair and the Y-Z pair. When this situation arises a PQS must take some action. In the prior art the action taken is to erase the entire join list and force the user to build a new list of joins. This can cause the user to have to redo a significant amount of work, especially when joins exist between multiple columns of two tables. Thus what is needed is a method and system whereby the PQS analyzes the remaining joins and make an intelligent decision as to which joins can be retained. A method which allows this decision to be made is needed.

SUMMARY OF THE INVENTION

The present invention is a method and a computer database system for analyzing the list of joins to determine whether all of the tables in the join list are joined to each other and take reasonable action if they are not. First, the groups of separately linked database table names are determined. If more than one group exists, then adjustment of the join list is required. If T(W) is joined to T(X) and T(X) is joined to T(Y), then T(W), T(X), and T(Y) are said to be in a linked group. If no other tables are in the group, then it is a separately linked group. If T(Z) is joined to other tables, then there is a second separately linked group. The join list may be adjusted to consist of any one of the groups by deleting from the join list all joined pairs not corresponding to the selected group. The selected group can be determined automatically by the PQS by determining the group which contains the first table name entered by the user, by determining the group containing the highest number of tables or joins, by prompting the user to select the group, or by any other logical process. The user can also be prompted to enter additional join statements either before or after the join list has been adjusted. In this manner coherency of the join list is assured without the need for reentering all of the elements of the join list.

BRIEF DESCRIPTION OF THE DRAWINGS

FIG. 5 is an example of pseudo-code for a partial embodiment of the method.

FIG. 6 is an example showing the intermediate states of the graph array between the initial state and the final state.

DESCRIPTION OF THE PREFERRED EMBODIMENT

The preferred method of analyzing the join list is to use a technique based on graph theory. Graphs may be defined symbolically, as well as, pictorially. A graph is a set of nodes connected together by lines. If the tables referenced in the join list are represented as the nodes of a graph, then the joins can be represented as lines connecting the nodes.

Figures 1, 2:
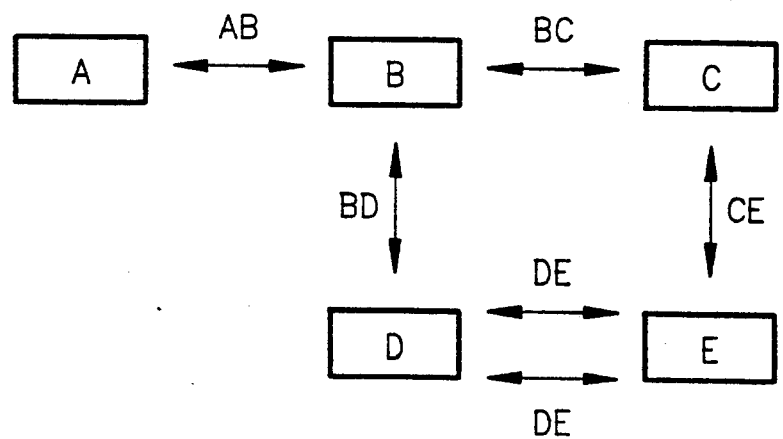
FIG. 1 shows a sample join list.
FIG. 2 is a graphical representation of the join relationships between the tables from the join list of FIG. 1.

FIG. 1 shows an example of a simple join list containing six join statements. The names of the tables are listed as A, B, C, D and E. The names in the 'Left' and 'Right' columns are the table names that were referenced on the left and right sides respectively of a join statement entered by the user. The corresponding left and right table column names, CL and CR, are left blank, since they are not required except as needed to derive their associated table names. Each row in this list represents a joined pair of tables. For example, the first row indicates that table A is joined to table B, and the last row indicates that table D is joined to table E. There is no inherent limit to the number entries a join list may have. There is no specific format that a join list is required to have. All that is required is that the information in the join list be sufficient to identify the tables of the join relationships.

FIG. 2 shows a graphical representation of the join list of FIG. 1. The tables are represented by nodes containing the name of the table. A join relationship, i.e., a line connecting two nodes, can be referenced symbolically by referring to the two nodes that the line connects. Thus, AB is a join relationship between tables A and B. Given these conventions the symbolic representation of the graph of FIG. 2 is Nodes(A,B,C,D,E), Lines(AB,BC,BD,CE,DE,DE).

Figure 3:
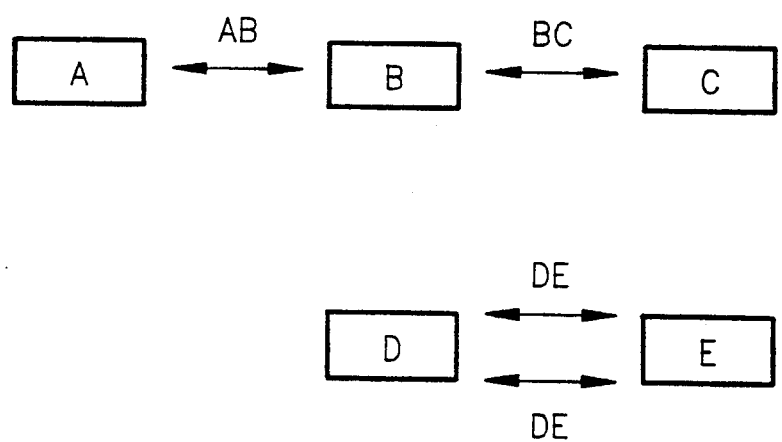
FIG. 3 shows the table relationships of FIG. 2 after the deletion of some joins.

Deleting a join relationship or a table is equivalent to deleting a line or a node of a graph. After one or more deletions there may exist multiple groups of separately linked nodes causing what was previously one graph to become multiple graphs. As used herein the term graph means a group of separately linked nodes representing database table names. Pictorially the deletion of a join results in the removal of the corresponding line from the diagram. Deletion of a table results in the removal of the corresponding node and all of its connecting lines from the diagram. If line CE is deleted from FIG. 2, the structure is still one graph. If line BD is also deleted, then there are two separately linked groups of nodes comprising two separate graphs. This condition is shown in FIG. 3. When the graphs are drawn, a human being can visually determine whether there is more than one group of nodes. A machine implementable method for performing this analysis in a PQS must use a different approach.

Figure 4:
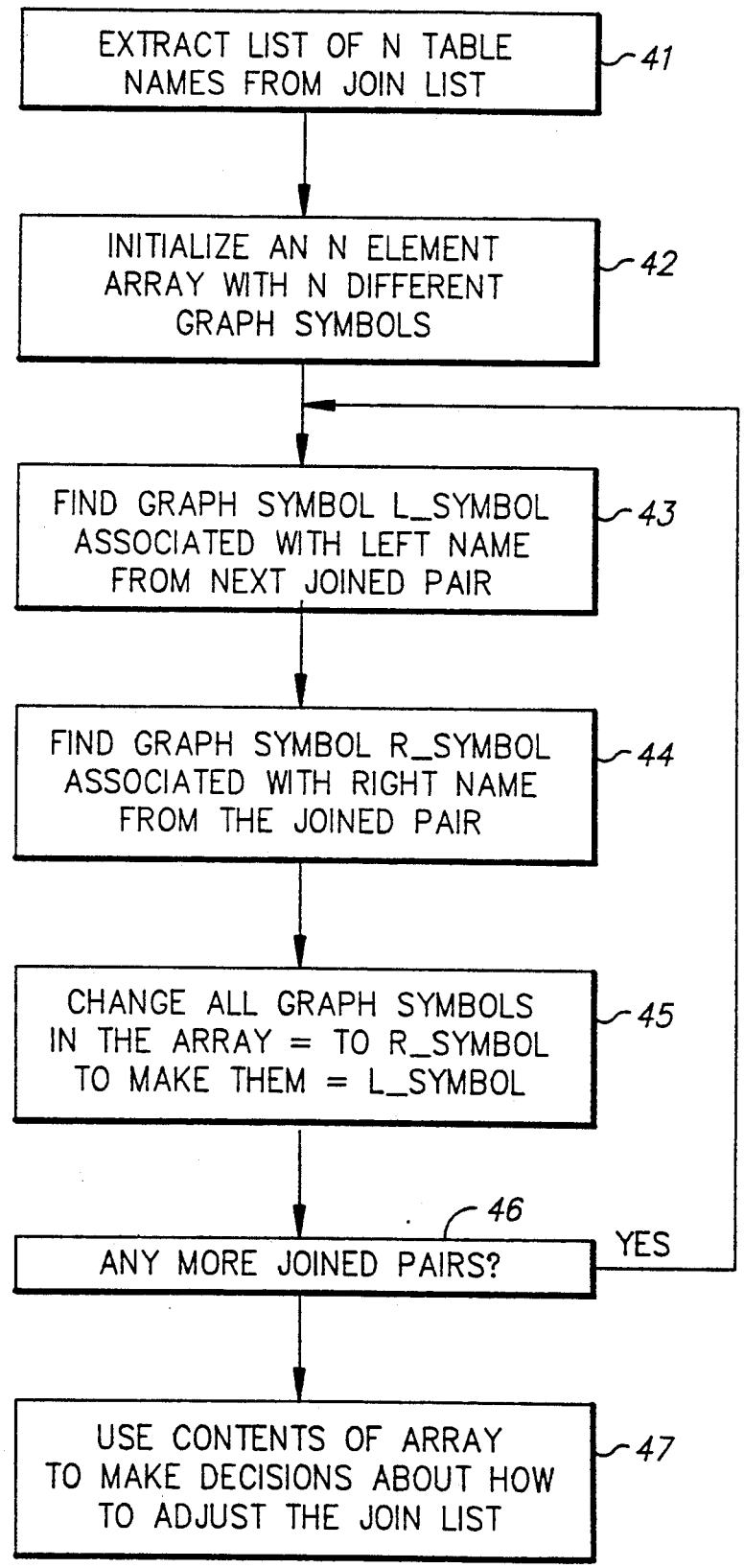
FIG. 4 is an overview of the flow of an embodiment of the method.

The join list is used to determine the number of graphs. A set of N nodes can make from one to N graphs. An array of N elements is used to keep track of which tables belong in which graphs. This will be called the graph array. FIG. 4 shows an overview of the method. A list of all of N database tables referenced in the join list is made in step 41. The list need not be in any particular order. Next the graph array must be initialized with unique symbols associated with each unique table name (42). These symbols can be the table names themselves, numbers, or any arbitrary symbols. The first table name in the list is associated with the first element in the graph array, and so forth, on a one to one basis. The graph array is initialized by storing a symbol in element one, a different symbol in element two, and so on, so that no two symbols in the graph array are the same. Each pair of table names in the join list are processed iteratively (46). For the pair of table names currently being processed the graph symbol associated with the left entry of the pair is found and stored in a variable L_SYMBOL (43). The graph symbol associated with the right entry of the pair is found and stored in a variable R_SYMBOL (44). The graph array is searched for all occurrences of the graph symbol stored in the variable R_SYMBOL and each occurrence is replaced with the graph symbol stored in the variable L_SYMBOL (45). After all of the pairs in the join list have been processed, the contents of the graph array contain a simple representation of the number and content of the groups of tables which can easily be used to make decisions about adjusting the join list (47). The method exploits the commutative property of the join relationship to simplify the number of graph symbols down to the minimum. Thus, the number of different graph symbols found in the array at the end of the process exactly corresponds to the number of graphs in the join list.

The join list must ultimately be adjusted to contain only one separately linked group of tables. Any logical basis for selection of one of the groups may be used. If the group containing the largest number of tables or the group containing the largest number of joins is selected, the maximum amount of the work previously performed by the user in specifying the joins might be preserved. Another logical rule for selecting the group, might be to select the group which contains the table name first entered by the user. Allowing the user to select the group after being prompted with meaningful information about the groups would be reasonable option. The user can also be given the opportunity to enter additional join statements at different points during the adjustment process.

FIG. 5 shows an example of how part of the algorithm might be described in pseudo-code. At the start of the pseudo-code example N must contain the number of tables in the join list. The names of the tables must be in a list which can be accessed by the function NUMERIC_INDEX() which takes a table name as its input and returns the numerical index which corresponds to the table name. The numerical index can be thought of as the position of the name in the list. The code to create the name list and the code for the function NUMERIC_INDEX() are not shown. In lines 501 through 504 the two arrays used in the pseudo-code, GRAPH_IDENTIFIERS and GRAPH_ID_COUNT are initialized. GRAPH_IDENTIFIERS will be used to track membership in a graph. GRAPH_ID_COUNT will be used to count the number of tables in each graph. Preferably these arrays will be created and updated in the memory of the computer. In line 502 each element of GRAPH_IDENTIFIERS from 1 to N is set equal to a unique number from 1 to N. In line 503 each element of GRAPH_ID_COUNT is set equal to zero. The graph processing is performed in lines 505 through 513. One pass through the outer loop is made for each entry in the join list (line 505). In line 506 the current graph symbol for the left entry in the joined pair is found by feeding the name in the left entry through the NUMERIC_INDEX() function to get the index for the table name which is then used to reference the graph symbol in the GRAPH_IDENTIFIERS array. The graph symbol is placed in the variable L_SYMBOL. In line 507 the current graph symbol for the right entry in the joined pair is found in a similar manner and placed in the variable R_SYMBOL. In the inner loop (lines 509 to 512) the GRAPH_IDENTIFIERS array is adjusted by changing all symbols which are equal to the contents of R_SYMBOL by replacing them with the contents of L_SYMBOL.

After the all of the joined pairs have been processed the information in the GRAPH_IDENTIFIERS array is ready for further processing. Any elements that contain the same graph symbol represent nodes in the same graph. In line 514 the variable MULTIPLE_GRAPHS is initialized as false. Each element in the GRAPH_IDENTIFIERS array is examined to accumulate statistics (lines 515 through 520). If all of the symbols in the GRAPH_IDENTIFIERS array are not equal, then MULTIPLE_GRAPHS will be set to true (lines 518, 519). In lines 516 and 517 the number of tables in each group is counted in the GRAPH_ID_COUNT array.

If the NUMERIC_INDEX() function returns the number 1 for the index of the table name first entered by the user, then the group containing the first entered table name consists of all of the nodes which have the same symbol as in GRAPH_IDENTIFIERS(1). The group containing the largest number of tables can be found by finding the index of the largest number in the GRAPH_ID_COUNT array. This index can then be used to find the graph symbol for the group in the GRAPH_IDENTIFIERS array. The graph symbol can then be used to find all of the members of the group. Since every unique symbol in the GRAPH_IDENTIFIERS array now represents a separate group, these groups can easily be determined and displayed for selection or manipulation by a user.

The example of FIG. 3 will be traced to further clarify the approach. In FIG. 6, 61 is the list of table names from the join list for FIG. 3. The initialized GRAPH_IDENTIFIERS array is labeled as 62. Initial unique symbols, the numbers '1' through '5', are placed in the array elements to represent all of the possible graphs. Table name A is associated with the first element of the GRAPH_IDENTIFIERS array and, therefore, the initial graph symbol for table A is '1'. Each table name is similarly associated with the corresponding array element as shown by the dotted lines in FIG. 6. Since FIG. 3 has four lines, there will be four passes through the main loop (see FIG. 4, steps 43 through 46, and FIG. 5, lines 505 through 513). The lines representing the joins can be processed in any order. In this case BC will be processed first. The left table entry of this pair is B which has an associated index of 2. The second element in the GRAPH_IDENTIFIERS array is '2', so L_SYMBOL is set to '2' (see FIG. 4, steps 43 and FIG. 5, line 506). The right table entry of this pair is C which has an associated index of 3. The third element in the GRAPH_IDENTIFIERS array is '3', so R_SYMBOL is set to '3' (see FIG. 4, step 44 and FIG. 5, line 507). Now all elements of the array which are equal to '3' are changed to '2' (FIG. 6, array 63). Examination of the array now shows that B and C are in the same graph because they have the same graph symbol, i.e., '2'. The join of AB causes all of the nodes formerly grouped with B to be regrouped with A (array 64). At this point it can be seen that A and C are in the same group although they are not directly joined. The DE join causes the graph symbol for E to be replaced with the graph symbol for D (array 65). Processing another join for DE causes no change in the array contents (array 66). The final contents of the array readily reveal that there are two graphs representing two separately linked groups of tables and that the largest number of tables in one group is three.

Figure 7:
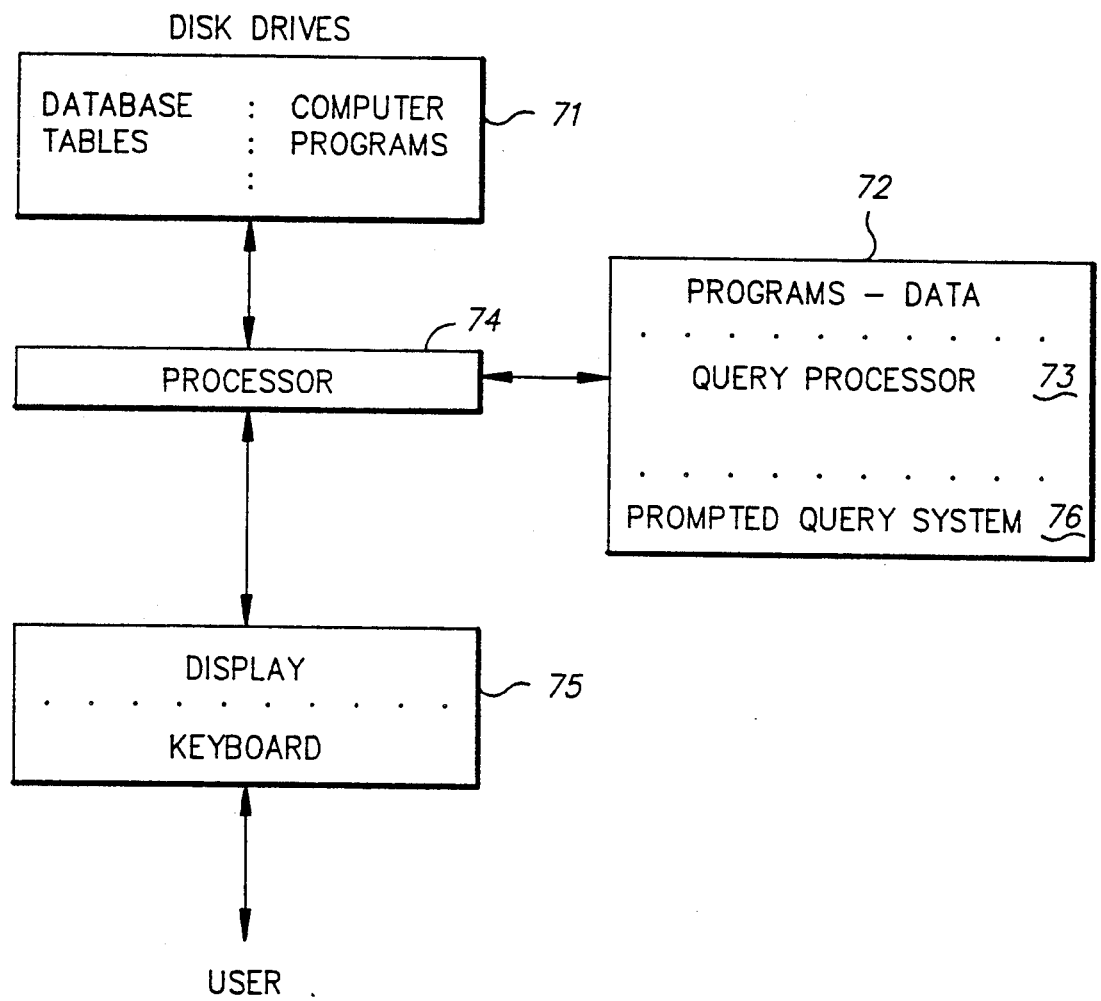
FIG. 7 is an overview of a computer system having the prompted query system.

FIG. 7 is an example of a computer system including a PQS. A data storage device such as disk drives 71 will typically contain both database tables and the computer programs which comprise the interactive database retrieval system. A small system might also use diskettes in the place of disk drives. When the computer programs are first installed there are no database tables. The tables are subsequently created by the user executing the programs. When the user enters appropriate commands on the terminal 75, the processor 74 will typically load the PQS program 76 into the memory 72 from a disk drive. The PQS will typically run in memory under the query processor portion of the database system 73. The commands, statements and information entered by the user on the terminal are translated into the input language of the query processor which might, for example, be the standard query language SQL. The prompts generated by the PQS are displayed on the terminal.

A PQS implementing the method of the invention can be prepared using standard computer programming techniques. The executable code for the PQS can be stored in machine readable form in a ROM, on a diskette, on a magnetic tape, or in any other memory device from which a computer can retrieve data which can be loaded into memory and executed as a program.

The method and system described above utilizing graphical analysis techniques allow a PQS to break down a join list into its separately linked groups so that the join list can be adjusted in an intelligent way by selecting one of the groups and/or adding additional joins. The ability to analyze the join list represents a advance over the methods and systems of the prior art.

One skilled in the art will easily recognize other PQS related actions which may be improved through the use of the present invention. While the preferred embodiment of the present invention has been illustrated in detail, it should be apparent that modifications and adaptations to that embodiment may occur to one skilled in the art without departing from the scope of the present invention as set forth in the following claims.

What is claimed is:

1. A computer-implemented method for analyzing a set of join statements logically joining database table names in a database having a plurality of named database tables, the method comprising the steps of:

(a) creating a join list of joined pairs of the database table names, the joined pairs having been entered by a user and one or more of the joined pairs having been deleted by the user after having been entered;

(b) analyzing the join list to determine groups of separately linked database table names by creating a graph array, elements of the graph array being associated on a one to one basis with the database table names referenced in the set of join statements and each said element in the graph array being initialized with a unique associated graph symbol, the join statements referencing one of the joined pairs of the database table names, the joined pair having a left entry and a right entry, then repeatedly adjusting the graph array so that the right entry of the joined pair of the database table names is associated with the graph symbol associated with the left entry of the joined pair by sequentially processing each said join statement; and (c) adjusting the join list to contain only a selected group of the linked database table names by deleting all the database table names not in the selected group.

2. The method of claim 1 wherein the step of adjusting the join list further comprises prompting the user to enter join statements.

3. The method of claim 1 wherein the step of adjusting the join list further comprises determining the group of separately linked database table names which includes the database table name first entered by the user.

4. The method of claim 1 wherein the step of adjusting the join list further comprises determining the group of separately linked database table names which includes a largest number of the database table names or a largest number of the join statements joins.

5. An improvement on a computer database system of a type having a data storage device, a display terminal, means for creating a plurality of database tables on the data storage device, means for displaying prompting information on the terminal to assist a user in entering database retrieval statements, and means for reading a set of join statements logically joining database table names entered on the terminal by the user in response to the prompting information, comprising:

(a) deleting means for the user to delete a previously entered one of said join statements;

(b) means, coupled to the deleting means, for analyzing the set of join statements to group separately linked ones of said database table names by creating a graph array having elements, the elements of the graph array being associated on a one to one basis with the database table names referenced in the set of join statements and each said element in the graph array being initialized with a unique associated graph symbol, each said join statement referencing a designated joined pair of the database table names, the designated joined pair having a left entry and a right entry, then repeatedly adjusting the graph array so that the right entry of the designated joined pair of the database table names is associated with the graph symbol associated with the left entry of the designated joined pair; and (c) means for adjusting the set of join statements to contain only one said group of separately linked database table names.

6. The improvement of claim 5 wherein the means for adjusting the set of join statements further comprises means for prompting the user to enter the join statements.

7. The improvement of claim 5 wherein the means for adjusting the set of join statements further comprises means for prompting the user to select a group of the separately linked database table names.

8. The improvement of claim 6 wherein the means for adjusting the set of join statements further comprises means for determining a group of the separately linked database table names containing a largest number of the database table names or a largest number of the join statements.

9. The improvement of claim 5 wherein the means for adjusting the set of join statements further comprises means for determining a group of the separately linked database table names containing the database table name first entered by the user.

10. A computer-implemented method for analyzing a set of join statements logically joining database table names in a database having a plurality of named distinct database tables, the method comprising the steps of:

(a) creating a join list of joined pairs of the database table names, each said joined pair having a left entry name and a right entry name;

(b) associating each said database table name in the join list with a unique graph symbol;

(c) repeating steps d through f for each said joined pair of the database table names in the join list;

(d) finding the graph symbol (left symbol) associated with the left entry name;

(e) finding the graph symbol (right symbol) associated with the right entry name;

(f) changing all the graph symbols which are equal to the right symbol to equal the left symbol; and (g) adjusting the join list so that all the database table names in the join list are associated with a common one of said graph symbols.

11. The method of claim 10, the adjusting step further comprising the steps of:

(a) determining a first one of said entered database table names which was first entered by a user; and (b) determining the database table names which are associated with the same graph symbol as the first entered database table name.

12. The method of claim 10, the adjusting step further comprising the step of determining a group of the database table names having a highest number of the database table names or a largest number of the join statements.

13. The method of claim 10, the adjusting step further comprising the step of grouping the database table names into groups which have a common associated one of said graph symbols.

14. The method of claim 13, the adjusting step further comprising the step of prompting the user to select a group of the database table names.

15. The method of claim 10, the adjusting step further comprising the step of deleting from the join list all pairs of the database table names which are not associated with a selected one of said graph symbols.

* * * * *